(12) United States Patent
Varsamis et al.

(10) Patent No.: US 7,535,795 B2
(45) Date of Patent: May 19, 2009

(54) SEISMIC DATA ACQUISITION SYSTEM AND METHOD FOR DOWNHOLE USE

(75) Inventors: Georgios L. Varsamis, Houston, TX (US); Laurence T. Wisniewski, Houston, TX (US); Abbas Arian, Houston, TX (US)

(73) Assignee: Sensorwise, Inc., Houston, TX (US)

( * ) Notice: Subject to any disclaimer, the term of this patent is extended or adjusted under 35 U.S.C. 154(b) by 0 days.

(21) Appl. No.: 12/128,492

(22) Filed: May 28, 2008

(65) Prior Publication Data

US 2008/0224887 A1 Sep. 18, 2008

Related U.S. Application Data

(62) Division of application No. 10/710,513, filed on Jul. 16, 2004, now abandoned.

(51) Int. Cl.
*G01V 3/34* (2006.01)
(52) U.S. Cl. .............................. 367/76; 367/25; 367/81; 340/853.3; 340/853.9
(58) Field of Classification Search .................. 367/25, 367/76–78, 81–82; 340/853.1, 853.2, 853.3, 340/853.9
See application file for complete search history.

(56) References Cited

U.S. PATENT DOCUMENTS

| | | | |
|---|---|---|---|
| 3,986,162 A | 10/1976 | Cholez et al. | |
| 4,072,923 A | 2/1978 | Siems et al. | |
| 4,355,310 A | 10/1982 | Belaigues et al. | |
| 4,589,285 A | 5/1986 | Savit | |
| 4,718,011 A | 1/1988 | Patterson, Jr. | |
| 4,901,289 A | 2/1990 | Cretin et al. | |
| 5,062,084 A * | 10/1991 | Schoepf et al. | 340/853.9 |
| 5,148,407 A | 9/1992 | Haldorsen et al. | |
| 5,157,392 A | 10/1992 | Zimmer | |

(Continued)

*Primary Examiner*—Jack W. Keith
*Assistant Examiner*—Scott A Hughes
(74) *Attorney, Agent, or Firm*—Gary L. Bush; Brett T. Cooke; Andrews Kurth LLP (57) ABSTRACT

A method and system for conducting a seismic survey by lowering a string of intelligent clampable sensor pods with 3-C sensors into a borehole. The string of pods is serially interconnected by a cable having a conductor pair which provides both power and data connectivity. The uppermost sensor pod is connected to a downhole telemetry and control module. The cables and pods use connectors to allow assembly, customization, repair, and disassembly on site. Each pod has an upper and a lower connector, a processor, and memory which is coupled to both the upper and the lower connectors. Each pod is capable of simultaneous and independent serial communications at each connector with the memory. The telemetry and control module is designed to query the pods to determine the system configuration. The telemetry and control module then simultaneously triggers all pods to acquire data, the pods storing the collected data locally in the memory. After data collection, the controller simultaneously signals the pods to immediately transfer data serially from the local memory to the next higher adjacent pod and receive data, if any, from the lower adjacent pod, if any, storing the received data in memory. The first data transferred from each pod is that data collected by its local sensors. Subsequent data originates from lower pods and is simply passed up the string of pods to the telemetry and control module. In other words, the pods communicate in a bucket brigade fashion.

6 Claims, 5 Drawing Sheets

U.S. PATENT DOCUMENTS

| | | | |
|---|---|---|---|
| 5,189,262 A | 2/1993 | Engler et al. | |
| 5,253,219 A | 10/1993 | Houston et al. | |
| 5,331,318 A | 7/1994 | Montgomery | |
| 5,531,270 A | 7/1996 | Fletcher et al. | |
| 5,627,798 A | 5/1997 | Siems et al. | |
| 5,684,693 A | 11/1997 | Li | |
| 5,706,896 A | 1/1998 | Tubel et al. | |
| 5,721,538 A | 2/1998 | Tubel et al. | |
| 5,730,219 A | 3/1998 | Tubel et al. | |
| 5,810,080 A | 9/1998 | Meynier | |
| 5,917,160 A | 6/1999 | Bailey | |
| 6,308,137 B1 | 10/2001 | Underhill et al. | |
| 6,462,672 B1 | 10/2002 | Besson | |
| 6,529,443 B2 | 3/2003 | Downey, Jr. et al. | |
| 6,552,665 B1 | 4/2003 | Miyamae et al. | |
| 6,630,890 B1 | 10/2003 | Endo et al. | |
| 6,661,737 B2 * | 12/2003 | Wisniewski et al. | 367/25 |
| 6,693,554 B2 | 2/2004 | Beique et al. | |
| 6,816,082 B1 | 11/2004 | Laborde | |
| 2003/0176974 A1 | 9/2003 | Baliguet et al. | |
| 2005/0001735 A1 | 1/2005 | Hall et al. | |
| 2006/0013065 A1 | 1/2006 | Varsamis et al. | |

\* cited by examiner

SEISMIC DATA ACQUISITION SYSTEM AND METHOD FOR DOWNHOLE USE

CROSS REFERENCE TO RELATED APPLICATION

This application is a divisional application of patent application Ser. No. 10/710,513 filed on Jul. 16, 2004, now abandoned the priority of which is claimed.

BACKGROUND OF THE INVENTION

1. Field of the Invention

This invention relates generally to seismic systems, and more particularly to seismic systems used in the hydrocarbon exploration and mining industries. Specifically, this invention relates to a system and method for transmitting data from remote measuring stations in a vertical seismic profiling or cross-well seismic profiling toolset.

2. Description of the Prior Art

Measuring seismic data in boreholes has origins which can be traced back to 1917, where the technology was introduced in U.S. Pat. No. 1,240,328 issued to Fessenden. Because of the widespread preference for surface-recorded seismic surveys, borehole seismic recording has often been limited to the velocity check-shot survey, a method used to determine seismic velocities over various intervals in the well for interpretation of surface recorded seismic data.

A typical check shot survey involves lowering a geophone or hydrophone into a well to a selected position and measuring the time for an acoustic pulse at the surface to travel to the receiver. Receivers are often simple pressure transducers and are incapable of detecting the polarity and amplitude of a waveform in three dimensions. Receiver locations are generally separated by hundreds of vertical feet. The recording window is long enough to record only the directly arriving signals; wave reflections and total borehole response are not recorded. The check-shot provides a direct correlation between subsurface stratigraphy and seismic reflections measured at the surface, and it allows surface seismic data recorded in the time domain to be converted to lineal depth.

Figure 1:
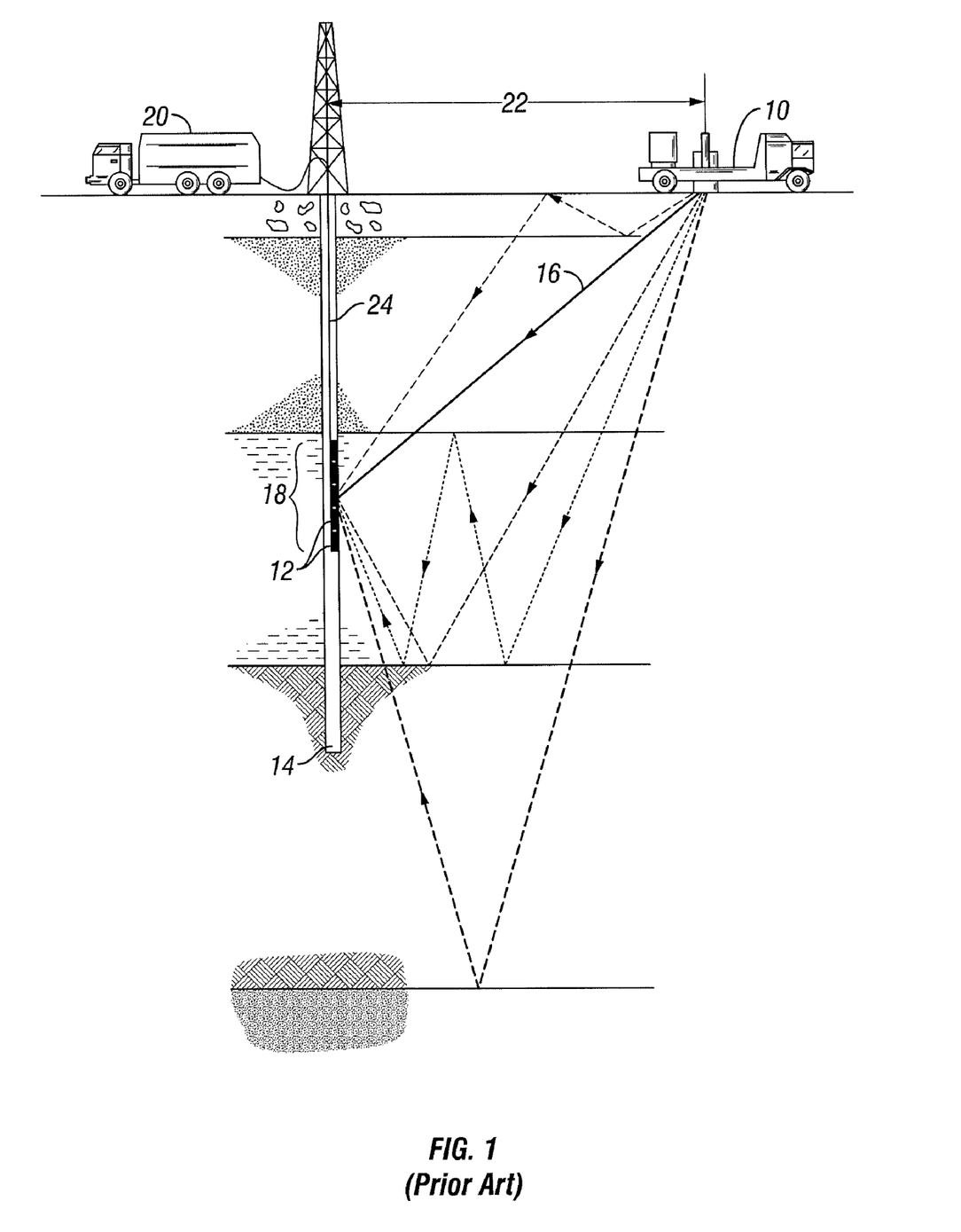
FIG. 1 illustrates a vertical profiling system of prior art showing a VSP array disposed in a borehole recording seismic waves produced from a surface source.

However, in the last twenty-five years interest has grown in more comprehensive borehole-recorded seismic surveys, such as vertical seismic profiling (VSP). As illustrated in FIG. 1, VSP is the recording of seismic energy from a surface source (10) by geophones (12) in a well or borehole (14) to obtain a high resolution image of the subsurface geology adjacent to the borehole. Because the downhole receivers record direct arrival waves (16), VSP images are higher in resolution than surface seismic images which are generated only by reflected, attenuated waves. VSP can provide in situ rock properties, particularly seismic velocity, impedance, anisotrophy, and attenuation, and it aids in understanding seismic wave propagation, e.g., source signatures, multiples, and conversions.

FIG. 1 shows the basic components of a VSP survey: a surface-based seismic source (10), a downhole receiver array (18) of sensors (12), and a surface-based recording/wireline truck (20) or other recording means. The lateral distance from the surface source to the well is referred to as "offset" (22). Zero-offset VSP, in which the shot is located near the well, provides a seismic time-to-depth relationship, interval velocities in depth, and a normal-incidence reflectivity trace. Offset VSP, in which the shot is a further distance from the well, allows for the imaging of the subsurface away from the well. When a series of offset VSP surveys are conducted, with sources positioned along a line radiating outward from the well at varying offsets, it is referred to as a walk-away VSP. Walk-away VSP creates a two-dimensional reflectivity image away from the well. Three-dimensional vertical seismic surveys can also be conducted using a full areal set of shots on the surface. A related downhole seismic survey is cross-well profiling (CWP), in which a VSP receiver array is placed in a first borehole while the seismic source is lowered into a second borehole and emitted therefrom.

VSP uses a number of downhole geophones (12) in the receiver array (18), usually at a regular spacing interval of 50 to 100 feet. Single component receivers, such as vertical axis geophones or hydrophones, may be free-hanging in the array, but multiple-component receivers, such as triaxial geophones, must be clamped to the borehole wall in order to couple to the wave in all three dimensions. A common prior art VSP receiver array (18) configuration has receiver pods (12), with three-component geophones, deployed at five depth levels, as illustrated in FIG. 1. The triaxial geophones are connected with standard seven-conductor wireline logging cables (24) and are located in pods (12) designed to clamp to the borehole wall.

In practice, the receiver array (18) is usually lowered to the bottom of the well (14), clamped to the borehole sides, and then set to record a surface-generated source shot or shake. The collected data is transmitted to the recording truck (20) via the wireline cable (24). The tool (18) is then unclamped from the borehole sides, moved its length up the hole, and re-clamped; the source (10) is reactivated and measured. This sequence continues up the hole (14) to capture the entire vertical profile. VSP surveys can be conducted in open as well as cased holes, but cased holes are often preferred because they allow the use of magnetic clamping tools and avoid borehole stability problems.

Figure 2:
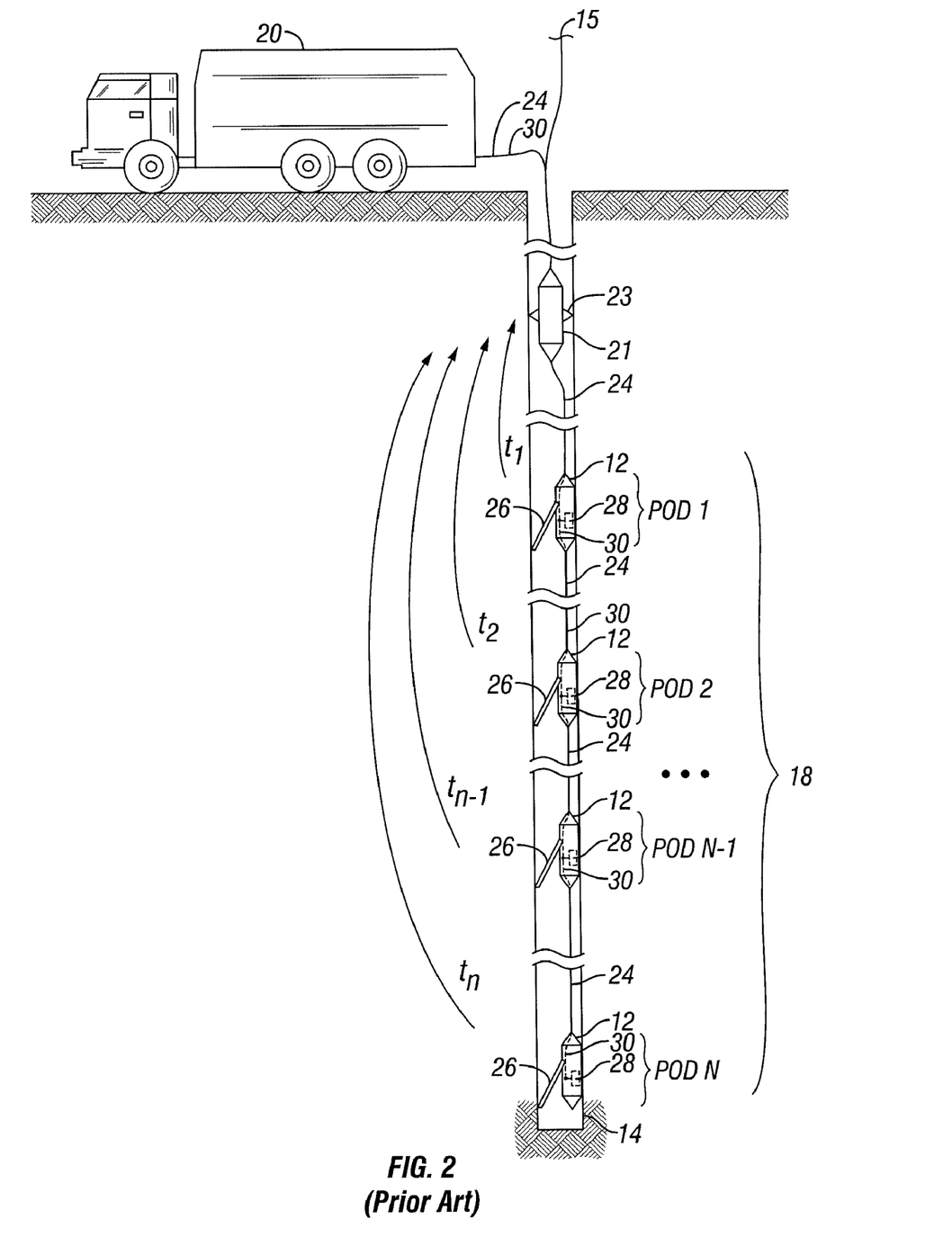
FIG. 2 illustrates a VSP array of prior art with sensor pods fixed to the cable and communicating with a surface controller via a common databus.

FIG. 2 illustrates an enlarged view of a portion of the prior art borehole seismic recording system of FIG. 1. The system includes a surface-based controller (20) connected to a downhole telemetry module (21), which in turn is connected to one end of a string (18) of remote sensor pods (12). The string (18) is lowered into a borehole (14) and suspended by a winch or hoist (15). Each pod has a clamping mechanism (26) to mechanically couple the pod to the borehole wall. The pods (12) are typically hard-wired into the array (18) and have over-molded connections to the cable (24). Thus, the array configuration is generally fixed; it is not possible to change the configuration at the job site, and field repairs are limited.

It is advantageous to record measurements over the whole vertical range of the well to provide the most complete depth and coverage, but it is also more costly. The cost of VSP or CWP depends on the number of depth levels recorded, the total vertical distance of the operation, the number and type of source offsets, time on site, tool rental costs, and mobilization/demobilization costs. Thus, increasing the number of receivers which can collect data in a given array or otherwise speeding up the process may reduce cost.

One major inefficiency of the borehole seismic process is the need for each downhole multi-component receiver to be clamped to the borehole wall. The clamping and unclamping process takes time. Free-hanging receiver arrays using only vertical geophones or free-hanging hydrophone strings with simple pressure transducers may be attractive choices for VSP or CWP; many receivers can be deployed with minimal effort, and considerable time is saved by avoiding repetitive clamping and unclamping. However, these receivers provide only single component data which limits subsurface imaging and seismic data extraction, because compression (P) and shear (S) data cannot be resolved. Additionally, because the receivers are free-hanging, borehole waves are a major source of noise. Although some of this noise can be removed with various filtering operations, free-hanging sensors do not image as deep as their clamped-geophone counterparts.

The current trend is to record data with three-component geophones which allow three-component data processing techniques used to discern the different wave arrivals, such as P, SV, and SH, for improved seismic interpretations. Cost reduction of borehole seismic surveys using clamped geophones is gained by increasing the number of depth layers on the toolsets. The greater number of levels which can be measured at one time, the fewer times the array must be moved to cover the vertical depth of the well.

As borehole seismic technology matures, the amount of data collected increases. Higher signal resolution, a greater number of depth layers in the arrays, the use of 3-C geophones, and increases in the recording time to capture multiple wave reflections all enlarge the amount of the data which must be sent to the surface recorder. Often, a downhole telemetry module (21) is coupled between the surface recorder (20) and the array (18). The telemetry module may contain power supply circuitry and motor controller/driver circuitry for the pods (12) and a large memory buffer to temporarily store data transmitted from the pods. The telemetry module may also contain an anchor (23) and an optional gamma ray emitter. The telemetry module may be used to shorten the distance and time for data transfer from the pods by receiving the pod data and storing it within a large memory buffer for later transfer to the surface-based main controller.

Although some systems employ cabling with enough analog wire pairs to accommodate a large number of three-component receiver stations, most systems continue to use standard seven-conductor wireline cable. The cable often includes strength members which support the weight of the sensor array. The large capital invested in seven-conductor cable and equipment may make a transition to another cable type cost prohibitive.

Thus, VSP and CWP often use semi-intelligent receiver pods which digitize the measured analog seismic waveforms and store the data in a buffer (28), as shown in FIG. 2. Although each of the sensor pods (12) can be directly wired to the downhole telemetry module more commonly the pods (12) are coupled to the telemetry module (21) using a common databus (30). Each memory buffer (28) is tied to the bus (30) with a driver capable of driving the bus. Generally, the system is arranged so that only one pod drives the bus at a time. The seven-conductor wireline cable (24) contains a coaxial cable used as a databus (30) to which each buffered receiver pod is multiplexed. Receivers, in sequential fashion, send their stored data to the telemetry module (21) along the common databus (30) after the seismic event has occurred.

Figure 3:
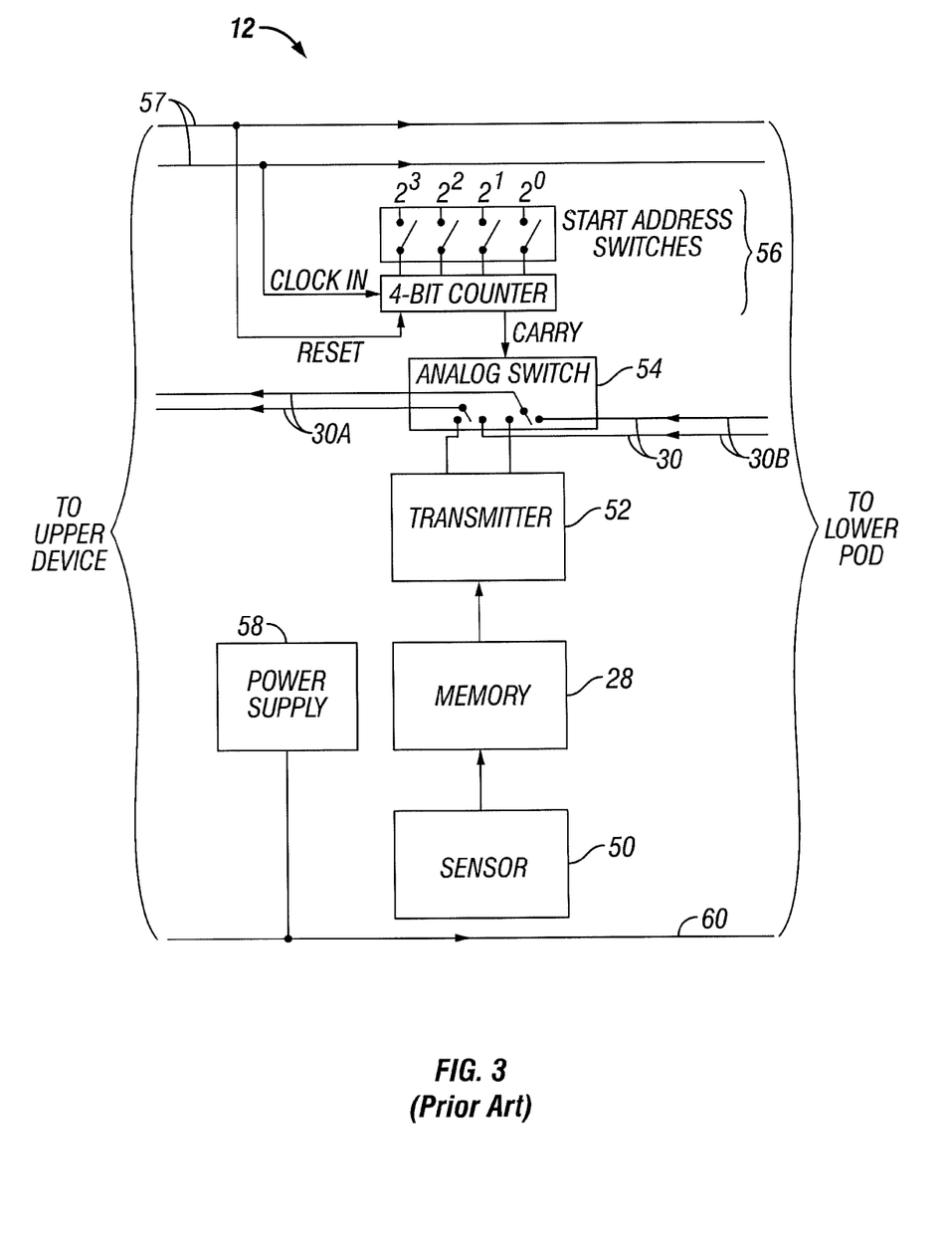
FIG. 3 is a schematic diagram in block component detail which illustrates the electronic circuitry of a sensor of prior art, specifically a method of coupling to a common databus for the transmission of data.

FIG. 3 is a schematic diagram in block level detail showing the electronic circuit of one type of prior art receiver pod (12). The receiver is powered by a power supply (58) which is tied to a power bus (60) that is independent of the data bus (30). The receiver pod (12) has a sensor (50) whose output is digitized and stored in a memory buffer (28). In this example, the buffer (28) is connected to a common databus (30), shared by all receiver pods in the array (18) (See FIG. 2), by a transmitter (52) and an analog double-throw switch (54). When the pod (12) is driving the bus (30), switch (54) connects the upper portion (30A) of the bus to the transmitter (52) and disconnects the lower portion (30B) of the bus. When the pod (12) is not driving the bus (30), it is disconnected by switch (32). The analog switch (54) is controlled by an addressing circuit (56) and control lines (57). The transmitter (52) must be designed to transmit the signal to the telemetry module, which can be a significant distance.

Referring back to FIG. 2, the databus cable (30) must be long enough to extend from the telemetry module (21) to the most remote receiver, POD N, at the bottom of the well. The long length reduces the available bandwidth of the databus. The most remote pod is the most affected by the limited bandwidth. One at a time each pod will transfer its data directly to the telemetry module. For example, POD 1 will transfer the contents of its buffer (28) to the telemetry module (21) in time $t_1$, then POD 2 will transfer directly to controller (20) in time $t_2$, etc., until POD N completes the cycle by transferring its collected data in time $t_N$. Time $t_N$ is substantially greater than time $t_1$. The total time for all of the data stored in the array (18) of N sensors to be transferred to the telemetry module (21) is the summation of the individual transfer times $t_1 \ldots t_N$, which can be significant in arrays with a large number of pods or having a long distance to the telemetry module.

As the number of receivers continues to rise, the large data volumes which must be transmitted to the receiver before the array can be repositioned, bottlenecked by the insufficient bandwidth of the databus, becomes significant. A high capacity datalink is desirable. Some systems have explored the use of a fiber optic cable for a databus. In addition to the obstacle of overcoming the inertia of the capital investment in seven-conductor wireline cable, as discussed earlier, fiber optics are problematic from a materials standpoint because of the high downhole temperatures encountered.

3. Identification of Objects of the Invention

A primary object of the invention is to provide a method and system for improved borehole seismic measurement by improving data transfer rates between the downhole components in an array of intelligent sensors.

Another object of the invention is to provide a method and system to communicate with each sensor in the seismic array and power each array sensor using a shared conductor pair. Sensor control and power may originate from either a downhole telemetry and control module or a surface-based controller.

Another object of the invention is to provide a method and system to selectively allow a concurrent trigger pulse to all sensors in the array to promote synchronous recording and sampling by the sensors.

Another object of the invention is to provide a method and system to send data acquisition and control parameters and commands to each of the sensor pods by the bucket brigade method, starting from the telemetry and control module.

Another object of the invention is to provide a method and system for a seismic array having a varying number or type of sensors located therein, the sensors having connectors to allow interconnection in varying numbers and with varying lengths of cable, thus allowing easy configuration changes and array repair in the field.

Another object of the invention is to provide a method and system for an intelligent sensor array which can determine its current configuration by using either the telemetry and control module or the surface controller to sequentially query each sensor pod in the array to determine the capabilities and location within the sensor array and also to assign a temporary identification number to each sensor pod.

Another object of the invention is to provide a method and system for a downhole sensor array of up to 200 clamping receiver pods each equipped with 3-C sensors.

SUMMARY OF THE INVENTION

The objects identified above, as well as other features and advantages of the invention are incorporated in a method and system for conducting a seismic survey by lowering a string of intelligent sensor or receiver pods into a well or other borehole. The string of pods is serially interconnected by a cable having a conductor pair, e.g., a coaxial cable, which provides both power and high-speed data connectivity to the string of pods. The uppermost sensor pod is connected to a downhole telemetry and control module which can control the system and provide power to the sensor pods. The telemetry and control module in turn is connected via a standard-speed data link to the surface-based main controller. Preferably, the telemetry and control module has a large memory buffer capable of storing data transmitted by the pods for a number of seismic shots for later transmission at a convenient time to the surface controller. While the telemetry and control module is described as a single module, separate modules can also be incorporated (a telemetry and a control module) without changing the capabilities of the system. The telemetry and control module may also include a large memory buffer either as an integrated module or yet another separate module. The telemetry and control module may also include a power conditioning and supply module either as an integrated module or yet another separate module. The "telemetry and control module" as used in the specification and claims may encompass all four functions, i.e., power, telemetry, control and memory (data storage) existing as a single module or a combination of separate modules.

The cables and pods use quick-disconnect connectors to allow assembly, customization, repair, and disassembly on site. Each pod has an upper and a lower connector and is capable of serial communication at its upper connector with either the telemetry and control module or an adjacent pod and at its lower connector with an optional adjacent pod. The string of sensor pods is connected upper connector of one to lower connector of another.

Preferably, each pod is equipped with 3-C geophones and an optional hydrophone and associated electronic circuits to convert analog signals to digital signals. Alternatively, the pod may contain analog or digital micro-electromechanical sensors. Each pod also contains a processor and memory which is coupled to both the upper and the lower connectors via communications converters. Each pod is capable of simultaneous and independent communications at each connector with the memory, but this capability is not required. The communications converters include circuitry typically used to link serial communications to a processor such as line drivers, universal receiver/transmitters, etc.

Preferably, each pod has a direct current path from the upper to the lower connector. The DC path includes an inductor to prevent the signals, being carried on the same line, from bypassing the pod communications converters and microprocessor during bucket brigade communications. In the bucket brigade mode of operation, data held in each pod's memory is transmitted upwards at the upper connector while data may be simultaneously (or near-simultaneously) received at the lower connector and stored in the memory in a first-in-first-out arrangement. However, there is also a switchable communications bypass around the inductor to allow for a pass-through mode of communications which allows a signal at the upper connector to pass through directly to the lower connector without passing though the communications converters, processor and memory The bypass is also used to allow the trigger signal to be concurrently sent to each of the sensor pods so they start acquiring simultaneously.

The system operates as follows: Initially, either the surface controller or the telemetry and control module queries the pods to determine the system configuration. Each pod sequentially transmits upward its unique identification and capabilities, or alternatively each pod is assigned a logical (temporary) address. Next, the surface controller or telemetry and control module communicates with the pods to configure the sensors, specifically the sample rates and number of samples to record. All pods are then placed in pass-through communications mode, where a signal present at the upper connector is directly routed to the lower connector. The surface controller or telemetry and control module then simultaneously triggers all pods to acquire data. The pods store the collected data locally in their memory. After data collection, all pods automatically revert back to bucket brigade mode. The telemetry and control module then commands the nearest sensor pod to send its data. This sensor pod then begins sending its data and simultaneously commands the next pod to send its data, and so on all the way down the sensor array. The first data transferred from each pod is that data collected by its local sensors. Subsequent data originates from lower pods and is simply passed up the string of pods to the telemetry and control module. Any sensor pod that self determines that it is malfunctioning, will engage its communications bypass relay so that it will be "skipped" in the data transfer process and allow the rest of the sensor pods below it to still transfer their data up the array. While in the preferred embodiment transmission of data to the next upper module and receipt of data from the next lower module occurs simultaneously, a completely equivalent system may be configured where the two processes are separated in time.

The bucket brigade method allows a high speed data transfer from all of the remote pods to the telemetry and control module and vice versa, because each pod only requires the capability to communicate over the distance to the next adjacent device rather than directly with the telemetry and control module. The shorter distances allow greater data rates. Optional repeaters can be used to increase the maximnum allowable distance between any two pods if required. Subsequent data transfer from the telemetry and control module to the surface controller occurs using standard transmission methods at standard transmission speeds.

The transfer of data can occur after each seismic shot or after a number of seismic shots depending on the sample sizes and the size of memory contained in the pods.

BRIEF DESCRIPTION OF THE DRAWINGS

The invention is described in detail hereinafter on the basis of the embodiments represented in the accompanying figures, in which.

DESCRIPTION OF THE PREFERRED EMBODIMENT OF THE INVENTION

Figure 4:
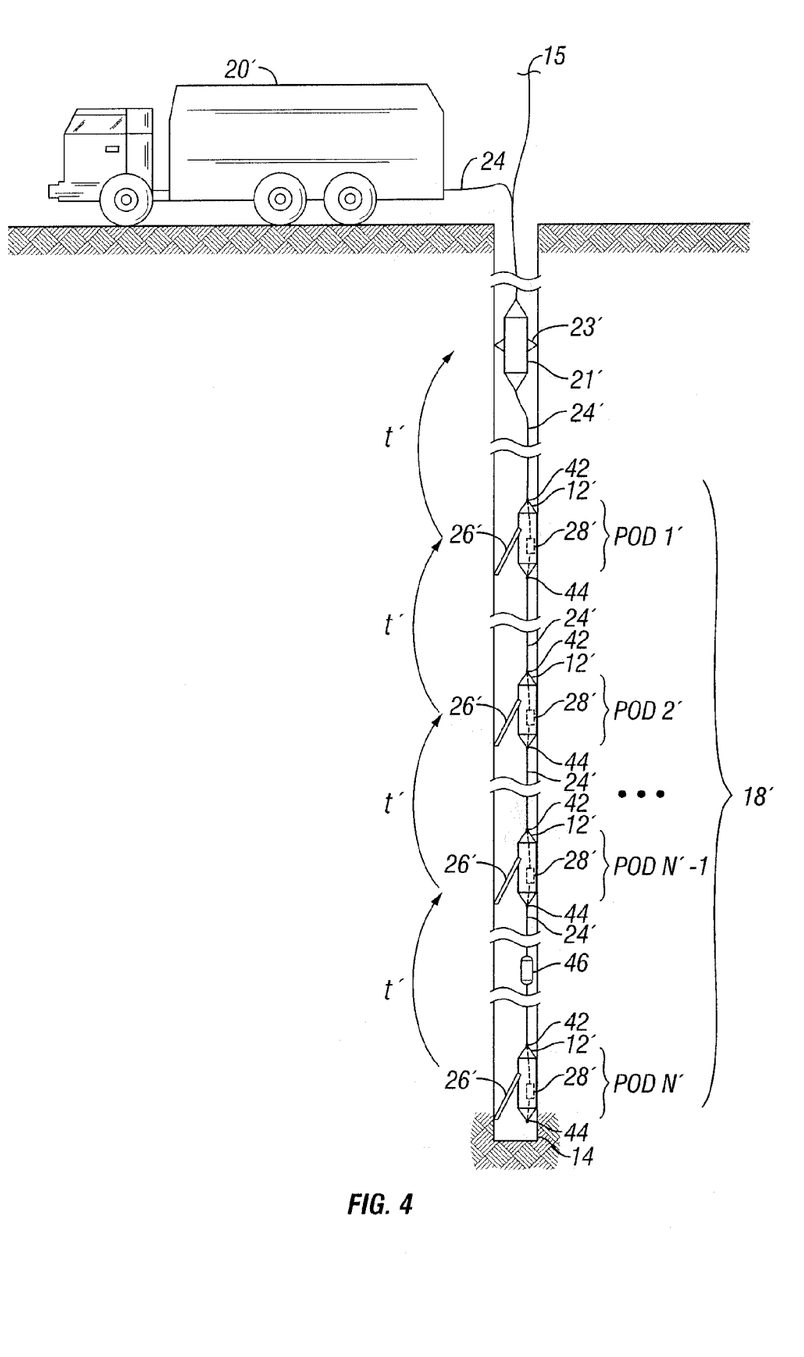
FIG. 4 illustrates a borehole seismic array according to the present invention having an adjustable number of sensor pods which may be freely interconnected with varying cable lengths and in varying numbers and types, the pods communicating with a telemetry and control module in a bucket brigade manner.

FIG. 4 illustrates a borehole seismic recording system according to the invention. The system includes a surface-based main controller 20' connected to a telemetry and control module 21', which is in turn connected to one end of a string 18' of multiple remote measurement stations, or pods, 12' that are interconnected serially by cables 24' and quick-disconnect connectors 42, 44. The telemetry and control module 21' and the string 18' are lowered into a borehole 14 and suspended by a winch 15. Because the pods are interconnected in the array 18' using releasable connectors instead of e.g., overmolding, the pods 12' and the cable segments 24' are easily removed from the array for repair. In fact, the array can be field modified to suit particular requirements by adding or removing pods, shifting sensor depths (by substituting cable segments with differing lengths), or substituting pods with different sensor types. Each pod 12' which is equipped with sensors, e.g., 3-C sensors, also has a clamping mechanism 26'. Additionally, the telemetry and control module 21' has an anchoring mechanism 23'.

Each pod has an upper connector 42 and a lower connector 44 for interconnecting the pods in the array using a cable with two or more conductors, for instance a coaxial cable. The communications cable 24' allows serial data transfer, and can optionally be used to supply power to the pods by carrying a DC voltage. Although this embodiment is described using electrically conductive cable, communications may also be implemented using fiber optic components. Each pod 12' is capable of serial communication at its upper connector 42 with either the telemetry and control module 21' or an adjacent pod 12' and at its lower connector with an optional adjacent pod 12'.

Each pod 12' has two communications modes which can be set by either the surface controller 20' or telemetry and control module 21'—a pass-through mode and a bucket brigade mode. In the pass-through mode, a signal present at the upper connector 42 is capacitively coupled to the lower connector 44, i.e., it passes directly through the pod 12', although the signal is also received and interpreted by the pod 12'. In the bucket brigade mode of operation, data held in a local pod memory buffer 28' is transmitted from the upper connector 42 while data is received at the lower connector 44 for temporary storage in the local pod memory buffer 28'; serial communication occurs at both ends 42, 44 of the pod 12' either in sequential fashion or concurrently and independently.

Power to the remote measurement stations 12' is provided by the surface controller 20' or the telemetry and control module 21' to the string 18' of remote measurement stations 12' through cable 24'. Power is fed through each of the remote measurement stations 12' to the next lower station 12'. The voltage level to the remote measurement stations 12' is monitored and adjusted by the surface controller 20' or telemetry and control module 21' to compensate for varying loads and power line resistance. The power supplies the pod electronics and the clamping mechanisms 26'.

Referring to FIG. 4, the system operates as follows: Initially, the main controller 20' or the telemetry and control module 21' communicates with the remote measurement stations 12' to determine the system configuration. Each remote station 12' within the array 18' is intelligent, i.e., it contains a processor; when queried, each pod 12' notifies the surface controller 20' or the telemetry and control module 21' of its capabilities. Thus, the method according to the invention allows a user to assemble a linear array 18' of pods 12' on site with varying numbers of pods 12' and sensor types. The surface controller 20' or telemetry and control module 21' queries and automatically determines the capabilities of an array 18' attached to it.

One method by which the surface controller 20' or telemetry and control module 21' can determine the configuration of an attached array 18' is to first place all pods 12' in a bucket brigade communications mode, which is accomplished by the surface controller 20' or the telemetry and control module 21' transmitting an appropriate signal on cable 24'. Next, when the surface controller 20' or telemetry and control module 21' sends a query command, the command is received only by the uppermost pod 12'. The first pod 12' responds to the query by transmitting up a unique identification and whatever parameters are requested. The first pod 12' then passes the query command down to the next adjacent pod 12', which in turn sends back up its unique identification and parameters. The second pod's information is passed up by the first pod to the main controller or telemetry and control module. The process continues with the second pod 12' sending the query command to the third pod, etc., until all pod identifications and parameters have been passed in sequence to the main controller 20' or telemetry and control module 21'. Once the identifications and locations of the attached pods 12' are known, communication with a particular pod 12' on an individual basis is accomplished by sending an appropriate signal on cable 24', either directly if the pods 12' are in pass-through mode, or by downward bucket brigade method if the pods 12' are in bucket brigade mode.

After the configuration of the array 18' is determined, the surface controller 20' or telemetry and control module 21' communicates with the remote measurement stations 12' to configure the sensors. Preferably, the remote measurement stations 12' have programmable sample rate and sample time parameters which are set by the main controller 20' based on the needs of the user.

Data acquisition is triggered by the surface controller 20' or the telemetry and control module 21'. All pods 12' are placed in the pass-through communications mode, where a signal present at the upper connector 42 is capacitively coupled to the lower connector 44. In the pass-through mode, no actions are required by a pod microprocessor to propagate a signal between upper and lower connectors, although the signal is received and interpreted by the microprocessor. Once all pods 12' are set to the pass-through mode, the surface controller 20' or telemetry and control module 21' can synchronously trigger all the pods 12'. Thus, when all of the pods 12' are armed and ready, the surface controller 20' or telemetry and control module 21' initiates data acquisition to coincide with the seismic source, and the sensors simultaneously acquire data. Since the distance from the telemetry module to the last pod can be quite long, the propagation delay for the trigger signal to reach the more remote pods should be taken into account. Thus, simultaneous triggering as used herein is not used in its most rigorous sense.

The pods 12' store their acquired data locally in memory, e.g., random access memory (RAM) 28' until the data is transferred to the telemetry and control module 21'. Unlike the seismic arrays of prior art, the pods 12' according to the present invention do not transfer data to the surface controller or a downhole telemetry module on a databus. The bucket brigade mode of operation is used in place of a databus to transfer the collected data from the pods to the surface controller or the downhole telemetry and control module. Recall that all pods 12' are placed in pass-through communications mode in order to initiate data collection. During data collection, the pods remain in pass-through mode; the collected data is stored locally. On a command from the telemetry and control module 21' or main controller 20', each remote station 12' simultaneously switches to the bucket brigade communications mode and immediately begins to transfer data serially from memory to the next higher adjacent station and receive data, if any, from the immediately lower adjacent station, if any. The received data is written to memory, e.g., RAM 28'. The first data set transferred from each remote station 12' is that data collected by sensors within that station 12' and stored locally. Each subsequent transfer from the remote station 12' is passing data up that it received from the pod 12' below it. In other words, the data flows from pod to pod up the pd interconnect (e.g., coaxial) cable to the telemetry and control module, in a bucket brigade fashion.

The bucket brigade system of the preferred embodiment is characterized by simultaneous (or near simultaneous) transmission and receipt of data from each pod. The transmission and receipt of data for each pod can occur sequentially in an equivalent system. The bucket brigade communication concept of the preferred embodiment is illustrated by the arrows in FIG. 4. Upon initiation of data transfer, POD 1 transmits its collected data to the telemetry and control module 21' while simultaneously (or near simultaneously) receiving data from POD 2. After POD 1 has transferred its collected data to the telemetry and control module, it transmits POD 2's collected data, now stored in POD 1's memory, e.g., RAM 28', to the telemetry and control module, and so on. If the longest transfer time from any pod to its superior neighbor is designated as t', then the total time for all of the data stored in the array 18' of N stations to be transferred to the telemetry and control module 21' is the product of N and t'. After all the data is transferred, the telemetry and control module 21' consolidates the received data from the pods 12' prior to later transfer to a surface controller 20'.

In the prior art system using a databus (see FIG. 2), the total transfer time is $\Sigma(t_1 \ldots t_N)$, where $t_N > t_1$. If t' equals $t_1$, which is likely, then the total transfer time according to the present invention, N·t', is less than the prior art system.

The bucket brigade communications method allows a high speed data transfer from all the remote stations to the telemetry and control module, and from the telemetry and control module to each remote station, in such a manner that each remote station only has to have the capability to communicate over the cable length from itself to the next device, rather than all the way to the telemetry and control module directly. This allows a simple communication circuit and higher data transfer rates. For the preferred embodiment, since each remote station transmits data up as it receives data from the next station down, there is no significant delay introduced. The telemetry and control module preferably buffers the received data for later transfer to the surface-based controller on a conventional data link.

Also illustrated in FIG. 4 is an optional repeater 46. A repeater is used to boost the serial communications signal strength for long cable runs. Preferably, the communications circuitry in pods 12' are capable of 150 foot transmission distances at significant baud rates, e.g., 10 Mbps or more. One or more repeaters can be used to extend the transmission range to greater than 150 feet when desired. The method and system according to the invention can support many, e.g., 200, pods 12' connected within an array 18', provided the maximum distance between any two pods does not exceed that required to sustain a high baud rate, e.g., 150 feet.

Figure 5:
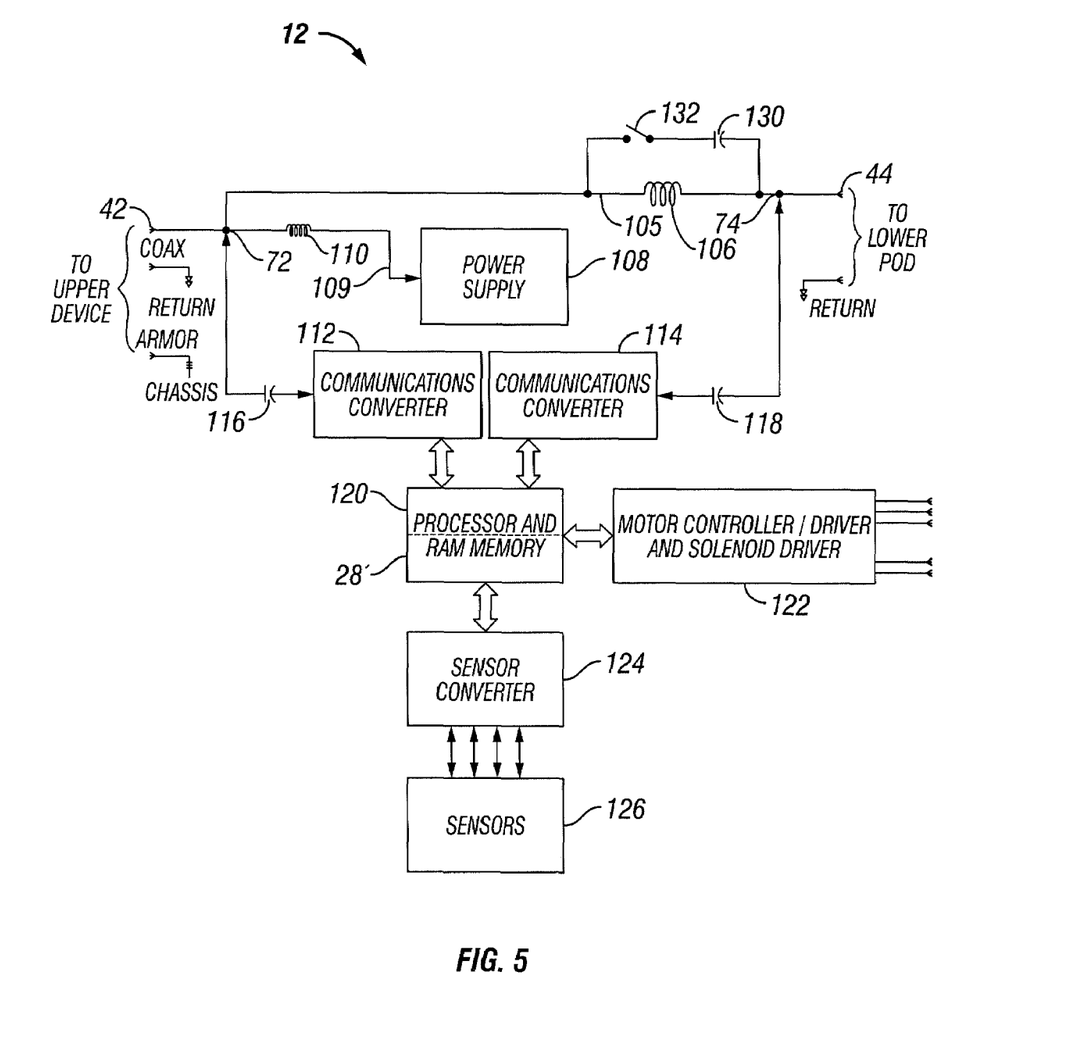
FIG. 5 is a schematic diagram which illustrates in block component level the electronic circuitry of a sensor pod according to the invention.

FIG. 5 illustrates schematically in block level detail the electronics for each pod 12' according to the invention. Each pod 12' has an upper connector 42 and a lower connector 44 for connecting the pod to a supply conductor which carries both power and data. A return conductor is provided, which for example can include cable armor or the shield of a coaxial cable. Power is supplied by standard means, for example 200V to 500V DC, which originates from the surface-based controller 20' or telemetry and control module 21' (See FIG. 4). Each pod contains a direct current path 105 with a large inductor 106 which carries all direct current to the lower pods and which prevents signals from bypassing the pod electronics during bucket brigade communications. The direct current from the coaxial cable is coupled to a pod power supply 108 by a smaller inductor 110, which serves to eliminate ripple on the power supply input 109. The power supply converts the 200-500 VDC to voltage levels suitable for the pod electronics, typically 3.3 VDC, +/– 5 VDC, and the required voltage for the solenoid/motor clamping mechanism.

The upper and the lower connectors 42, 44 are coupled to nodes or interfaces 72, 74, respectively. Interface 72 is in turn coupled to communications converter 112 by a capacitor 116, and interface 74 is likewise coupled to a communications converter 114 by a capacitor 118. Capacitors 116, 118 block direct current but allow signals to pass. The communications converters 112, 114 include circuitry typically used to allow a processor to communicate serially, such as line drivers, a buffer, and a universal receiver/transmitter which converts data from a parallel to serial arrangement and vice versa. The communications converters 112, 114 communicate with a 120. The processor 120 includes memory, e.g., RAM 28' for local storage of data. The processor 120 in turn controls the clamping mechanism via a motor controller or solenoid driver 122, communicates with the onboard sensors via a sensor converter 124, and communicates with the telemetry and control module 21' and/or the main controller 20'.

The pod 12' preferably accommodates a variety of sensor combinations 126. For example, the pod 12' may contain 3 geophones, which may be 3-C gimbaled, 3-C fixed, or 3-C fixed but including 3 axis accelerometers. When the pod contains geophones, the sensor converter 124 may include analog circuitry in addition to analog-to-digital converters. Alternatively, the pod 12' may contain up to three analog or digital micro-electromechanical systems (MEMS). A digital MEMS sensor provides direct digital output, so that the sensor converter 124 design is simplified. The pod may additionally contain an optional hydrophone sensor and associated circuitry in the sensor converter 124.

The pod 12' according to the invention and illustrated in FIG. 5 also includes a capacitor 130 which can be switched in and out to bypass inductor 106. The switch 132 is controlled by the processor 120. When switch 132 is closed, capacitor 130 allows a.c. signals to pass freely from connector 42 to connector 44 and vice versa, i.e., it places the pod 12' in pass-through communications mode. In pass-through mode, a signal at connector 42 is still received at the communications converters 112, 114 and is processed by processor 120. When switch 132 is open, the pod 12' is in bucket brigade communications mode, i.e., the inductor 106 blocks a.c. signal transmission.

An array 18' (see FIG. 4) of pods 12' transfers the collected data to telemetry and control module 21' (see FIG. 4), in the following manner. Pod 12' initially has collected data by sensors 126 and transferred the data through sensor converter 124 to memory, e.g., RAM 28'. Switch 132 is initially closed, causing pod 12' to be in pass-through mode. The telemetry and control module 21' or surface controller 20' (see FIG. 4) initiates data transfer by transmitting a corresponding signal through the array 18' (see FIG. 4). The data transfer signal enters pod 12' at connector 42 passes through capacitor 116 to communications converter 112. The signal is then passed to the processor 120 which interprets the signal as an instruction to commence data transfer.

The processor 120 immediately causes switch 132 to be opened and directs the contents of memory, e.g., RAM 28' to be transmitted from connector 42 via communications converter 112 and capacitor 116. Simultaneously, the processor 120 stores any data received at connector 44 via capacitor 118 and communications converter 114 in memory, e.g., RAM 28'. The data is formatted in such a way as to allow the telemetry and control module 21' or surface controller 20' (see FIG. 4) to identify the sensor from which it originated, and the processor 120 transforms the contents of memory, e.g., RAM 28' in a proper format, e.g., first-in-first-out manner. This process continues until the memory, e.g., RAM 28' is empty, ie., until all of the data from pod 12' and all those below it have been transferred upwards.

Although this system has been described in an embodiment suitable for seismic use in the hydrocarbon exploration industry, it is equally suitable for use wherever seismic data is recorded, for instance in the mining industry or for earthquake monitoring. Further, it is within the scope of the invention to use the system and method with other than seismic sensors. Non-seismic applications requiring a string of sensors to transmit data to a remote collection device are within the scope of the invention. While the preferred embodiment of the invention has been illustrated in detail, modifications and adaptations of the preferred embodiment may occur to those skilled in the art. Such modifications and adaptations are in the spirit and scope of the invention as set forth herein.

What is claimed is:

1. A method for conducting a downhole seismic survey comprising the steps of:
    assembling a string (18') having at least first and second sensor pods and a telemetry and control module by,
        a) providing said first and second sensor pods(12'), each characterized by having a sensor (126) therein operatively coupled to a multiple-bit memory (28') structured for storing data therefrom, a processor (120) operatively coupled to said memory (28'), a first node (72) in bi-directional communication with said memory (28') via a first communications converter (112), a second node (74) in bi-directional communication with said memory (28') via a second communications converter (114), and an inductor (106) electrically connected between said first node (72) and said second node (74),
        b) connecting a first cable between a telemetry and control module (21') and said first sensor pod (12'), said first cable including an electrical conductor that is connected between said telemetry and control module (21') and said first node (72) of said first sensor pod (12'), and
        c) connecting a second cable between said first sensor pod (12') and said second sensor pod (12'), said second cable including an electrical conductor that is connected between said second node (74) of said first sensor pod and said first node (72) of said second sensor pod;
    providing within said string a first signal path disposed between said telemetry and control module (21') and said memory (28') of said first sensor pod (12') including said electrical conductor of said first cable, said first node (72) of said first sensor pod (12'), and said first communications converter (112) of said first sensor pod (12');
    providing within said string a second signal path disposed between said memory (28') of said first sensor pod (12') and said memory (28') of said second sensor pod (12') including said second communications converter (114) of said first sensor pod (12'), said second node (74) of said first sensor pod (12'), said conductor of said second cable, said first node (72) of said second sensor pod (12'), and said first communications converter (112) of said second sensor pod (12');
    lowering said string into a borehole (14);
    simultaneously collecting first seismic data by said sensor of said first sensor pod and second seismic data by said sensor of said second sensor pod;
    storing said first sensor data in said memory of said first sensor pod while simultaneously storing said second sensor data in said memory of said second sensor pod; then
    transmitting said first data from said memory of said first sensor pod to said telemetry and control module via said first signal path while simultaneously transmitting said second data from said memory of said second sensor pod to said memory of said first sensor pod via said second signal path; and then
    transmitting said second data from said memory of said first sensor pod to said telemetry and control module via said first signal path.

2. The method of claim 1 further comprising the steps of:
    providing within said string a direct communications path (132, 130) along a common conductor (24', 72) to said processor of said first sensor pod and said processor of said second sensor pod; and
    signaling said first and second sensor pods via said direct communications path to simultaneously collect said first and second seismic data.

3. The method of claim 1 further comprising the step of:
    providing within said string a direct current power pathway disposed between said telemetry and control module (21') and said first and second sensor pods (12') including said conductor of said first cable, said first node (72) of said first sensor pod (12'), said inductor (106) of said first sensor pod (12'), said second node (74) of said first sensor pod (12'), said conductor of said second cable, said first node (72) of said second sensor pod (12'), said inductor (106) of said second sensor pod (12'), and said second node (74) of said second sensor pod (12'); and
    providing electrical power to said first and second sensor pods (12') via said direct current power pathway.

4. The method of claim 1 further comprising the step of:
    providing within each of said at least first and second sensor pods a conductive bypass pathway electrically connected between said first node (72) and said second node (74) in parallel with said inductor (106) and a switch element (132) electrically connected within said bypass pathway;
    closing said switch element (132) of said first sensor pod (12') to enable a common signal path between said telemetry and control module (21'), said memory (28') of said first sensor pod (12'), and said memory (28') of said second sensor pod (12'), said common signal path including said conductor of said first cable, said first node (72) of said first sensor pod (12'), said first communications converter (112) of said first sensor pod (12'), said bypass pathway of said first sensor pod (12'), said second node (74) of said first sensor pod (12'), said conductor of said second cable, said first node (72) of said second sensor pod (12'), and said first communications convener (112) of said second sensor pod (12'); and opening said switch element (132) of said first sensor pod (12') to disable said common signal path.

5. The method of claim 1 further comprising the step of:

determining a first desired number of sensor pods based on requirements of a first survey;

providing a combination of said first desired number of sensor pods characterized by having a first desired combination of sensor types based on requirements of said first survey;

providing said first desired number of cables (24');

removably connecting said combination of said first desired number of sensor pods by said first desired number of cables (24') to form a first custom string (18') customized for said first survey;

conducting said first survey; and then disconnecting said combination of said first desired number of sensor pods and said first desired number of cables (24') of first custom string (18').

6. The method of claim 5 further comprising the step of, automatically determining the composition and characteristics of said first custom string (18') by querying said processor of each of said combination of said first desired number of sensor pods.

\* \* \* \* \*